July 7, 1936.    A. M. HARKNESS    2,046,818
SULPHUR VAPORIZER
Filed June 30, 1933
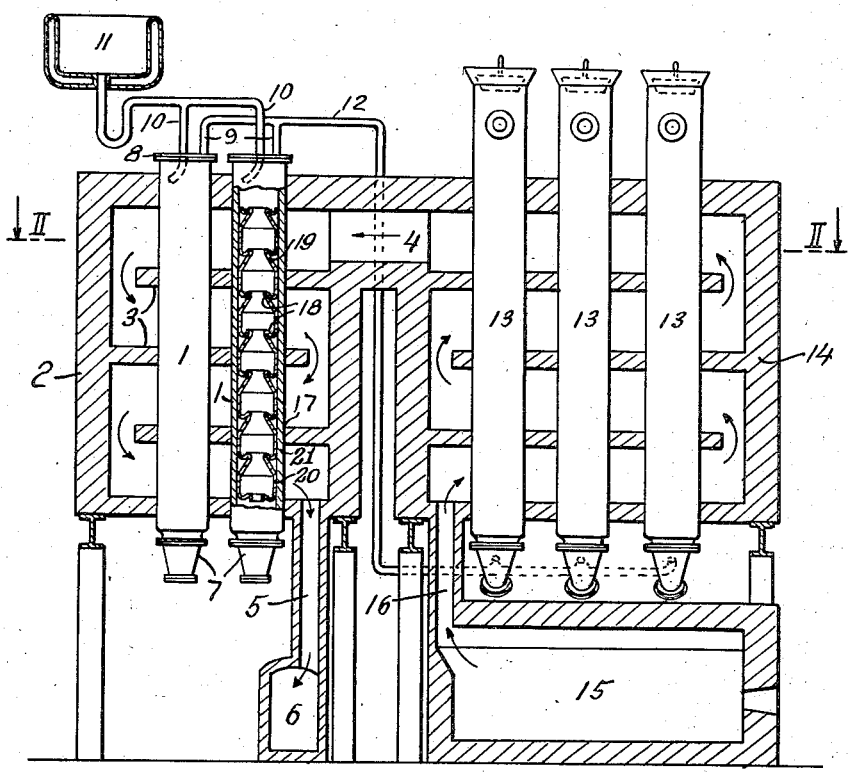
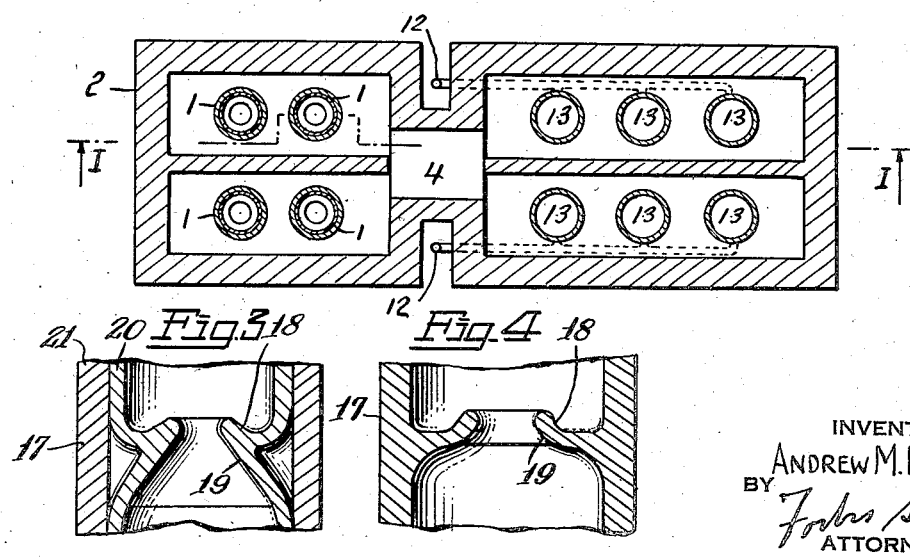
INVENTOR
ANDREW M. HARKNESS
BY
ATTORNEY Patented July 7, 1936

2,046,818

UNITED STATES PATENT OFFICE 2,046,818

SULPHUR VAPORIZER

Andrew M. Harkness, Nyack, N. Y., assignor to General Chemical Company, New York, N. Y., a corporation of New York Application June 30, 1933, Serial No. 678,395

4 Claims. (Cl. 23—264)

This invention relates to an apparatus for the production of carbon bisulphide by the reaction of carbon and sulphur. More particularly, this invention relates to a novel sulphur vaporizer and its combination with one or more retorts for carrying out the reaction between sulphur vapors and carbon.

It has heretofore been proposed to vaporize sulphur and to pass the sulphur vapors into a heated retort containing a bed of carbon such as charcoal, whereby carbon bisulphide is formed by the reaction of sulphur and carbon. It is an object of this invention to provide a novel apparatus for vaporizing molten sulphur in relatively large quantities, including provisions for conducting the sulphur vapors into a retort containing heated carbon to form carbon bisulphide with provisions for maintaining the required high temperatures of the retort and of the sulphur vaporizer in an economical manner.

The sulphur vaporizer of this invention comprises an elongated vertically disposed chamber having upon its inner walls a plurality of annular trough-like shelves vertically spaced along the walls of the vaporizer whereby molten sulphur, which is introduced into the top of the vaporizer at a point near the wall thereof, flows downwardly to the uppermost trough where it collects in a pool adjacent the wall of the vaporizer and, as the quantity of molten sulphur is augmented by additional sulphur introduced into the vaporizer, the pool overflows the inner edge of the trough and passes downwardly and along the side of the vaporizer to the next lower trough. In like manner, the molten sulphur overflows the edge of this lower trough and flows downwardly along the walls to the next lower trough. The sulphur vapors are drawn from the vaporizer and passed into the bottom of one or more carbon bisulphide retorts heated by gaseous products of combustion which are passed first about the carbon bisulphide retorts and thence about the sulphur vaporizer and supplies heat thereby to vaporize the sulphur.

The accompanying drawing illustrates one example of the apparatus of this invention. In the drawing Fig. 1 is a cross-section taken along the lines I—I of Fig. 2 of an assembly of retorts and sulphur vaporizers, Fig. 2 is a cross-section of the apparatus shown in Fig. 1 taken along the lines II—II, Fig. 3 is an enlargement of a portion of Fig. 1 showing a part of the cross-section of the vaporizer shown in Fig. 1, and Fig. 4 is a cross-section of a portion of a modification of the vaporizer shown in Fig. 1.

The apparatus shown in the drawing comprises a plurality of sulphur vaporizers 1 in a brickwork setting 2 comprising baffles 3 whereby a hot gas entering from a passageway 4 may be passed back and forth about vaporizers 1 progressing downwardly to a passageway 5 leading to an exit flue 6. Sulphur vaporizers 1 are provided with foot-pieces 7 which are provided with removable cover plates whereby ash which is deposited in the foot-pieces may be withdrawn. The top closures 8 of the sulphur vaporizers carry vapor outlet pipes 9 and inlet pipes 10 which serve to convey molten sulphur from a melting pot 11 into the tops of vaporizers 1 and discharge the molten sulphur along the walls of the vaporizers. Vapor outlet pipes 9 communicate with a pipe 12 which serves to convey sulphur vapors into the bottoms of a plurality of carbon bisulphide retorts 13. Retorts 13 are in a brickwork setting 14 above a combustion chamber 15 and are provided with baffles whereby hot products of combustion from chamber 15, entering the interior of setting 14 from a flue 16, are circulated back and forth about retorts 13 in a progressively upward direction and thence pass through passageway 4 into setting 2. Retorts 13 are provided at their upper ends, as is well known in the art, with means for charging carbon (charcoal or coke) into the retorts and for withdrawing therefrom carbon bisulphide.

Sulphur vaporizers 1 comprise an elongated cylindrical vessel 17 having upon its inner wall a series of annular troughs 18 which are preferably formed as an integral part of vessel 17, as shown in Fig. 4. However, as shown in Figs. 1 and 3, the troughs may be formed by protuberances on the inner wall of a shell 20 closely fitting into an outer shell 21, which two shells together form the wall of the vaporizer vessel 17. Vessel 17 may be of corrosion resistant metal or of a ceramic material, but is preferably of metal since the material has a relatively higher heat conductivity. The bottoms 19 of troughs 18 are inclined from the vertical and merge with the walls of the chamber forming the vaporizer so that a fluid overflowing the internal edges of the troughs will pass downwardly along the inclined bottom of a trough and along the sides of vessel 17 to the next lower trough.

In employing the apparatus described above and illustrated in the drawing for the production of carbon bisulphide, retorts 13 are charged with charcoal and sulphur is melted in pot 11 and passed into the top of vaporizers 1 to form pools of molten sulphur lying in the troughs within the vaporizers. Hot products of combustion are circulated around retorts 13 and thence are passed about vaporizers 1 to heat the carbon in the retorts to a temperature suitable for the reaction of carbon and sulphur to form carbon bisulphide and to vaporize sulphur in vaporizers 1, which vapors are conducted into the bottoms of retorts 13. Molten sulphur at the desired rate is fed from pot 11 into vaporizers 1 where it flows over the lips of the troughs and downwardly along the walls of the vaporizers and is vaporized by the heat of the gases passed about the vaporizers. The sulphur vapors pass upwardly through the central spaces between the annular troughs and out of the top of the vaporizers through pipes 9 to the retorts.

The sulphur vaporizer of this invention is particularly advantageous in that it provides a means whereby a continued supply of sulphur vapors may be produced despite fluctuations in the supply of molten sulphur to the vaporizer. The troughs which are a feature of the vaporizer of this invention provide a means for maintaining within the vaporizer a reserve of molten sulphur which is vaporized and serves to maintain a continued working of the carbon bisulphide retorts despite incidental variations or interruptions of the supply of molten sulphur to the vaporizers. On the other hand, by providing for molten sulphur to flow downwardly along the walls of the vaporizer during its normal working, effective conditions are provided for heat transfer from the gases passing about the vaporizers to the relatively thin sheet of molten sulphur flowing along the walls, thereby making it possible to vaporize relatively large quantities of molten sulphur by means of vaporizers of a moderate size.

While the apparatus described above is illustrative of this invention, the invention is not limited thereto since many changes and modifications in the particular apparatus described may be made without departing from the scope of the invention.

I claim:

1. A sulphur vaporizer comprising a vertically elongated chamber and a plurality of horizontally disposed troughs on the interior walls of said chamber, said troughs being vertically positioned with respect to one another and having their bottom portions inclined from the vertical and merging into the walls of the chamber whereby a liquid overflowing the edge of a trough flows downwardly along the bottom of the trough and along the wall of the chamber.

2. A sulphur vaporizer comprising a vertically elongated chamber and a plurality of horizontally disposed troughs on the interior walls of said chamber, said troughs being vertically positioned with respect to one another and having their bottom portions inclined in a vertical direction and merging into the walls of the chamber whereby a liquid overflowing the edge of a trough flows downwardly along the bottom of the trough and along the wall of the chamber, a sulphur melting pot and means for conducting molten sulphur from said pot into the top of said vaporizer and discharging the molten sulphur along the wall of the vaporizer, and means for conducting sulphur vapors from the top of said vaporizer into the bottom of a heated retort containing carbon.

3. A sulphur vaporizer comprising a vertically elongated chamber and a plurality of horizontally disposed troughs on the interior walls of said chamber and extending completely around said walls, said troughs being vertically positioned and widely spaced apart with respect to one another and having their bottom portions inclined from the vertical and merging into the walls of the chamber whereby a liquid overflowing the edge of a trough flows downwardly along the bottom of the trough and along the wall of the chamber.

4. A sulphur vaporizer comprising a vertically elongated cylindrical chamber having a plurality of horizontally disposed annular troughs on the interior walls thereof, said troughs being shaped to maintain a body of liquid therein in proximity to the walls of the chamber and having annular lips adapted to allow molten sulphur to flow from said troughs over their entire periphery, said troughs being vertically positioned with respect to one another, being spaced along the walls of said chamber, and being constructed with their bottom portions merging with the walls of the chamber and inclined from the vertical so that molten sulphur overflowing the edge of a trough passes along the bottom of the trough and thence downwardly along the wall of the chamber, and means for externally heating said chamber.

ANDREW M. HARKNESS.